United States Patent
Postlethwaite et al.

(10) Patent No.: US 8,375,051 B2
(45) Date of Patent: Feb. 12, 2013

(54) APPARATUS FOR CONTROLLING SUBSCRIPTIONS

(75) Inventors: David Postlethwaite, Horton Heath (GB); Jonathan Lee Rumsey, Winchester (GB); Ian Charles Edwards, Upper Shirley (GB); Peter Siddall, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 571 days.

(21) Appl. No.: 12/357,127

(22) Filed: Jan. 21, 2009

(65) Prior Publication Data

US 2009/0187570 A1  Jul. 23, 2009

(30) Foreign Application Priority Data

Jan. 21, 2008  (EP) .................................... 08150433

(51) Int. Cl.
*G06F 17/30* (2006.01)
(52) U.S. Cl. ......... 707/778; 707/705; 707/771; 707/797
(58) Field of Classification Search .................. 707/705, 707/706, 708, 797, 771, 778
See application file for complete search history.

(56) References Cited

U.S. PATENT DOCUMENTS

| 7,680,951 | B1 * | 3/2010 | Kulik ............................ 709/238 |
| 7,685,265 | B1 * | 3/2010 | Nguyen et al. ................ 709/223 |
| 8,200,706 | B1 * | 6/2012 | Sim-Tang ..................... 707/797 |
| 2005/0021843 | A1 * | 1/2005 | Duigenan et al. ............. 709/238 |
| 2005/0182773 | A1 * | 8/2005 | Feinsmith ..................... 707/100 |
| 2006/0056628 | A1 * | 3/2006 | Todd ............................. 380/233 |
| 2007/0022430 | A1 * | 1/2007 | Barker et al. ................. 719/318 |
| 2007/0033293 | A1 * | 2/2007 | Rumelhart .................... 709/238 |
| 2007/0088711 | A1 * | 4/2007 | Craggs ........................... 707/10 |
| 2008/0133541 | A1 * | 6/2008 | Fletcher et al. ................. 707/10 |
| 2010/0070448 | A1 * | 3/2010 | Omoigui ....................... 707/771 |
| 2010/0223284 | A1 * | 9/2010 | Brooks et al. ................. 707/769 |
| 2010/0274673 | A1 * | 10/2010 | Isaac ............................. 707/771 |

* cited by examiner

*Primary Examiner* — Rehana Perveen
*Assistant Examiner* — Tiffany Thuy Bui
(74) *Attorney, Agent, or Firm* — Novak Druce + Quigg LLP

(57) ABSTRACT

An apparatus for controlling subscriptions comprising: a detector operable to detect to a subscription associated with a wildcard topic string; and an analyzer, responsive to the detection of the subscription associated with a wildcard topic string and a topic string of a topic node matching the wildcard topic string, for analyzing a first attribute of the topic node; and means for determining whether a subscriber associated with the subscription should receive a message associated with the topic string of the topic node.

7 Claims, 8 Drawing Sheets

"UK"
"UK/Oxfordshire"
"UK/Hampshire"
"UK/Oxfordshire/Oxford"
"UK/Hampshire/Basingstoke"
"UK/Hampshire/Winchester"
"UK/Hampshire/Portsmouth"

APPARATUS FOR CONTROLLING SUBSCRIPTIONS

CROSS-REFERENCE TO RELATED APPLICATION

This application claims the priority and benefit of EP Patent Application 08150433.4, filed on Jan. 21, 2008, which is incorporated by reference herein in its entirety.

FIELD OF THE INVENTION

The present invention relates to an apparatus for controlling subscriptions.

BACKGROUND OF THE INVENTION

Publish and Subscribe (pub/sub) is an effective way of disseminating information to multiple users. Pub/Sub applications can help to simplify the task of getting business messages and transactions to a wide, dynamically changing and potentially large audience in a timely manner. In a pub/sub system, publishers are not concerned with where their messages are going, and subscribers are not interested in where the messages they receive have come from. Instead, a message broker typically assures the integrity of the message source and manages the distribution of a message according to subscriptions registered in the message broker.

Message "topic strings" typically provide the key to the delivery of messages between publishers and subscribers. With reference to a pub/sub system (100) as shown in FIG. 1A, instead of including a specific destination address in each message, a publisher (105) assigns a topic string to a message. A message broker (110) comprises a matching engine (115) for matching a topic string of a published message with a list of subscribers (120) who have subscribed to receive messages that are published to that topic string. In response to a match, the message broker (110) sends the published message to the subscriber (120).

Topic strings are often associated with a hierarchical structure, known as a "topic tree" having a number of "topic nodes." A topic node can have an associated "topic object" that can be administered. The topic object comprises one or more attributes and a topic string itself (wherein it is possible for the topic string to be set to "null").

An example of a topic tree is shown in FIG. 1B, wherein the topic tree comprises a root node having an associated topic string (i.e. "UK"). It should be understood that in some implementations, the root node can have a null topic string. A topic string can be created by aggregating topic strings of topic nodes from one or more levels in the topic tree. Levels of the associated topic string are separated by a "/" character. In the example depicted in FIG. 1B, the format of a fully specified topic string is "root/level2/level3".

Wildcard topic strings are typically provided for in a pub/sub system. For example, with reference to FIG. 1B, a subscription can be made to a wildcard topic string e.g. "UK/#", (where "#" denotes a wildcard character), such that the associated subscriber receives each message that has a topic string prefixed with the portion "UK". It should be understood that a wildcard character can represent any character and any number of characters. While the use of wildcard topic strings provides for an efficient method for allowing a subscriber to receive messages, further flexibility is required.

SUMMARY OF THE INVENTION

According to a first aspect, the present invention provides an apparatus for controlling subscriptions comprising: a detector operable to detect to a subscription associated with a wildcard topic string; and an analyzer, responsive to the detection of the subscription associated with a wildcard topic string and a topic string of a topic node matching the wildcard topic string, for analyzing a first attribute of the topic node; and means for determining whether a subscriber associated with the subscription should receive a message associated with the topic string of the topic node.

According to a second aspect, the present invention provides a method for controlling subscriptions comprising the steps of: detecting a subscription associated with a wildcard topic string; and analyzing, in response to the detecting step and in response to a topic string of a topic node matching the wildcard topic string, a first attribute of the topic node, and determining, in response to the analyzing step, whether a subscriber associated with the subscription should receive a message associated with the topic string of the topic node.

According to a third aspect, the present invention provides a computer program comprising program code means adapted to perform all the steps of the method described above when said program is run on a computer.

BRIEF DESCRIPTION OF THE DRAWINGS

The present invention will now be described, by way of example only, with reference to preferred embodiments thereof, as illustrated in the accompanying drawings. It is expressly noted, however, that the invention is not limited to the precise arrangements and instrumentalities shown.

FIG. 1B is a representation of a topic tree;

DETAILED DESCRIPTION

The preferred embodiment allows for a subscription to only apply to a certain portion of the topic tree, even though a wildcard topic string associated with the subscription may match topic strings associated with topic nodes in other parts of the topic tree.

Figure 1A:
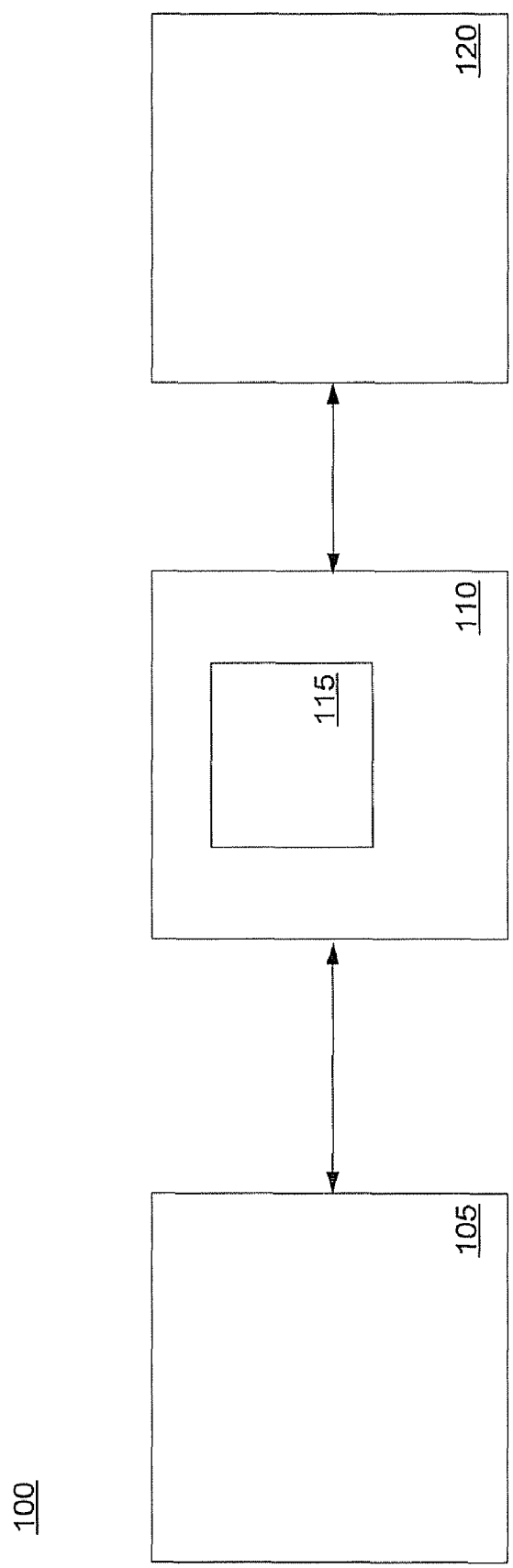
FIG. 1A is a block diagram of a prior art publish/subscribe system.
Figure 2:
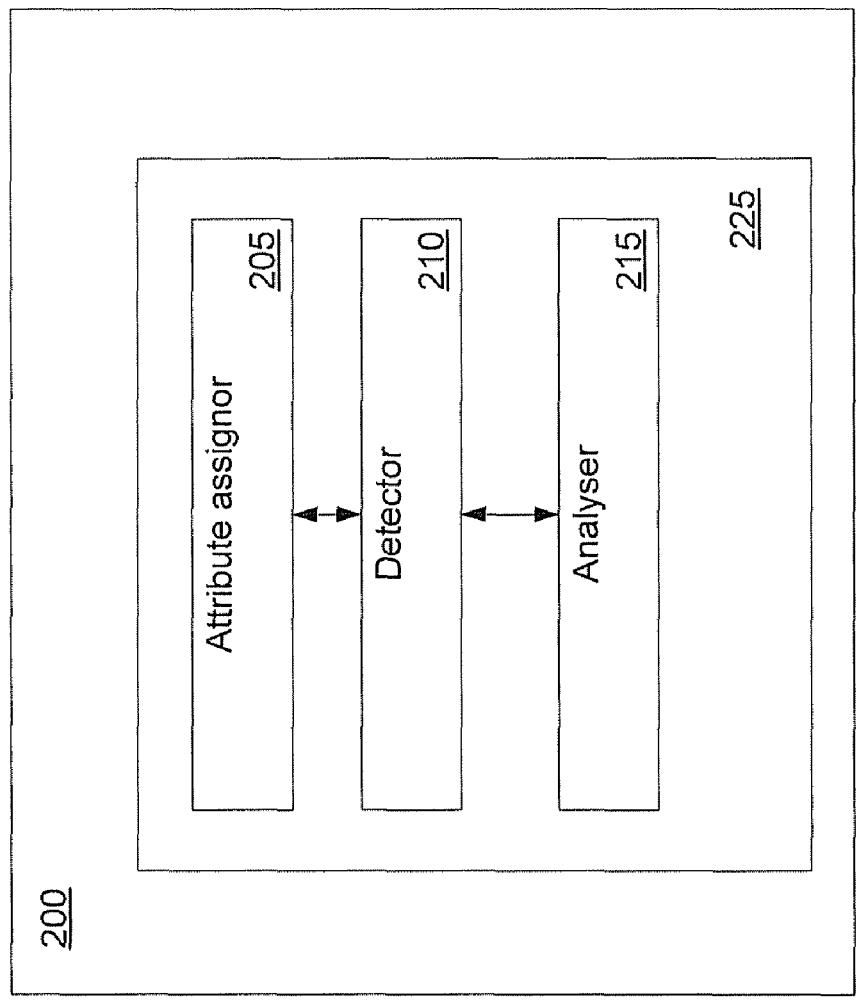
FIG. 2 is a block diagram of an apparatus according to the preferred embodiment.

A block diagram of an apparatus (225) according to the preferred embodiment is shown in FIG. 2. The apparatus (225) preferably resides on a broker and comprises an attribute assignor (205) for assigning a wildcard attribute (e.g. "WILDCARD") to each topic node in a topic tree, wherein preferably, the attribute has two values (e.g. "PASSTHROUGH" and "BLOCK"). The apparatus (225) further comprises a detector (210) and an analyzer (215). Preferably, the apparatus is operable to communicate with a publisher and a subscriber.

Figure 3A:
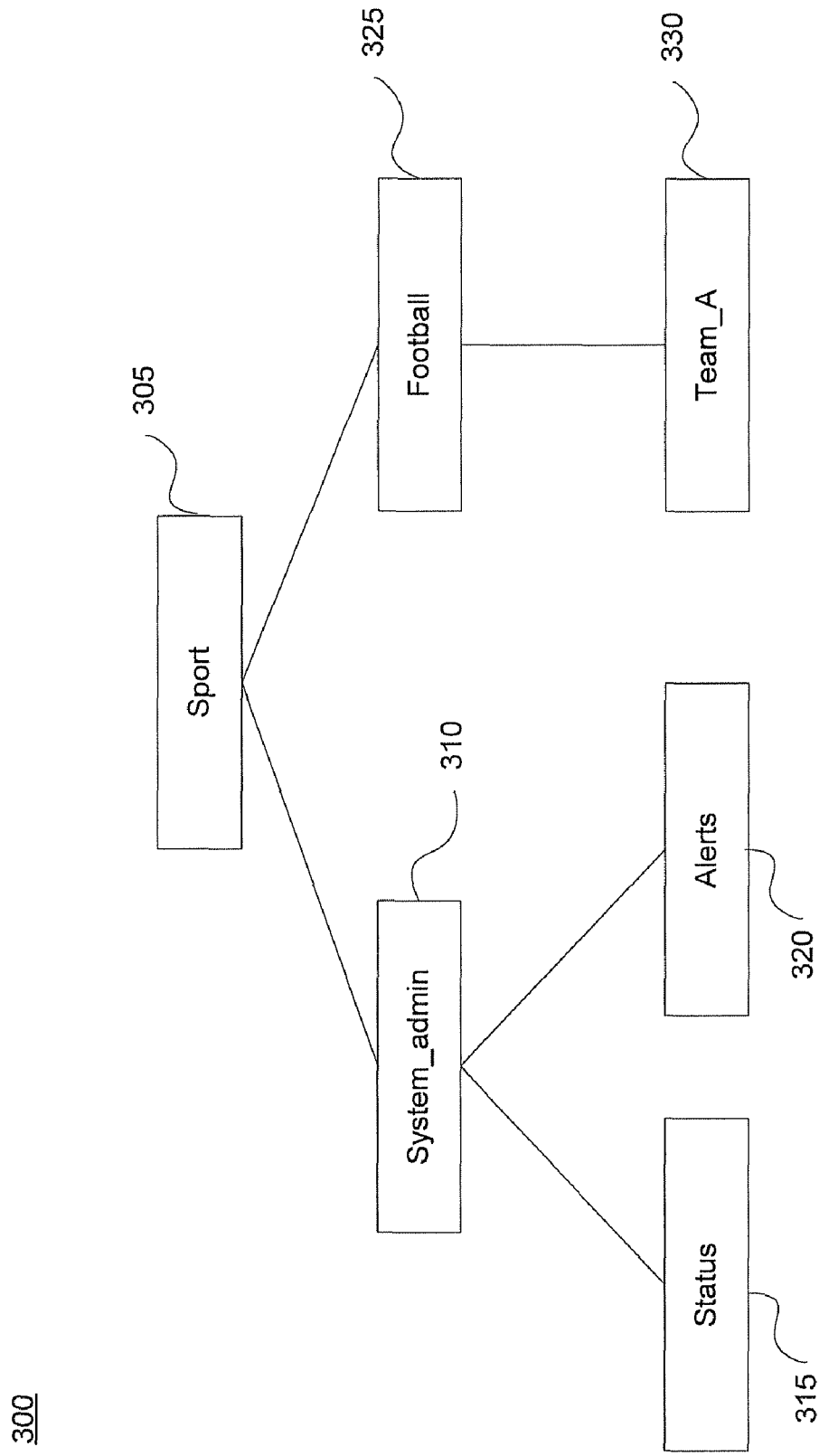
FIG. 3A is a representation of a topic tree.

A process according to the preferred embodiment will now be described with reference to the figures. At step 400, the attribute assignor (205) accesses a topic tree. With reference to FIG. 3A, an example topic tree (300) is depicted comprising a first (root) topic node (305) having an associated topic string, namely, "Sport"; a second topic node (310), having an associated topic string, namely, "Sport/System_admin"; a third topic node (315), having an associated topic string, namely, "Sport/System_admin/Status"; a fourth topic node (320), having an associated topic string, namely, "Sport/System_admin/Alerts"; a fifth topic node (325), having an associated topic string, namely, "Sport/Football"; and a sixth topic node (330), having an associated topic string, namely, "Sport/Football/Team_A". Preferably, each topic node comprises an associated list of subscribers.

At step 405, the attribute assignor (205) analyzes each topic node in the topic tree in order to determine which WILDCARD attribute value to assign. Preferably, the attribute assignor (205) assigns a WILDCARD attribute value to a topic node in accordance with input from an administrator. Alternatively, the attribute assignor (205) assigns a WILDCARD attribute value to a topic node in accordance with input from a system, a rule base, etc.

Figure 3B:
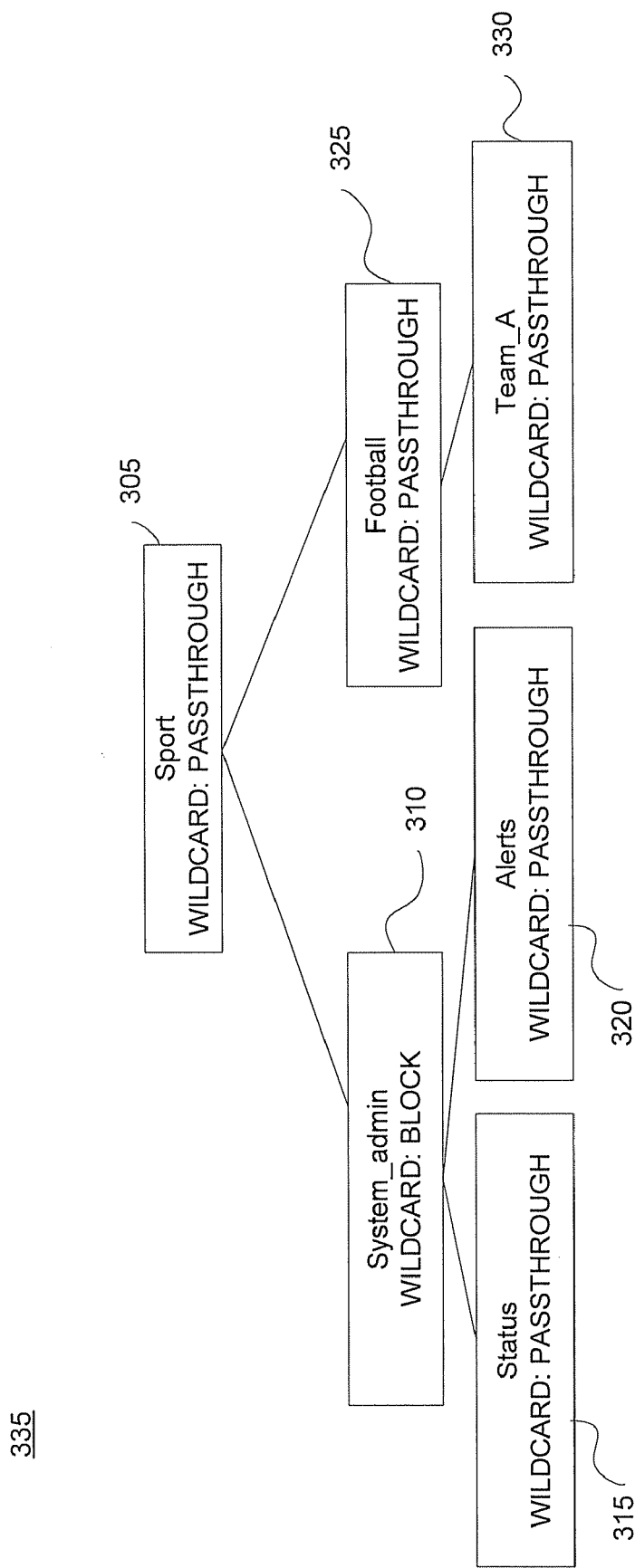
FIG. 3B is a representation of a topic tree according to the preferred embodiment.

Preferably, a default value of the WILDCARD attribute is PASSTHROUGH. In the example herein, the attribute assignor (205) assigns (step 410) the value "PASSTHROUGH" to each of the topic nodes (305, 315, 320, 325 and 330) in the topic tree with the exception of the second topic node (310) to which the attribute assignor (205) assigns the value "BLOCK". A representation of the resulting topic tree (335) is shown in FIG. 3B. In response to WILDCARD attribute values being assigned by the attribute assignor (205), the detector (210) waits for the generation of an event.

Preferably, the detector (210) waits for the generation of a first event associated with a subscription to a wildcard topic string being generated or a second event associated with a new topic node being generated. In the example herein, in response to detecting (step 415) the first event (e.g. by listening to a subscriber list at the broker), the detector (210) invokes the analyzer (215). In the example herein, a subscriber (e.g. "S1") makes a subscription to a wildcard topic string, namely, "#", which specifies each topic string in the topic tree.

In prior art solutions, a subscription made to such a wildcard topic string would normally result in messages associated with each topic string in the topic tree being sent to the subscriber. In the preferred embodiment, in response to a subscription to a wildcard topic string being generated and in response to being invoked by the detector (210), the analyzer (215) executes an analysis process (step 420). Preferably, the analyzer (215) analyzes the wildcard topic string in order to determine a highest level topic node in the topic tree which may match as will be described herein. Furthermore, the analyzer (215) analyzes the topic string and WILDCARD attribute value of the highest level topic node as will be described herein.

Preferably, the analyzer (215) looks for the topic string portion associated with the highest level preceding the wildcard character and the forward slash immediately preceding the wildcard character and determines the associated topic node as the highest level topic node. If there is no topic string portion preceding the wildcard character, the analyzer (215) determines that the root node is the highest level topic node.

In the example herein, the analyzer (215) determines that the first topic node (305) represents the highest level topic node. Thus, the analyzer (215) now knows where to start its further sub-processes of analysis. Furthermore, in the example herein, the analyzer (215) analyzes an associated topic string of the first topic node (305) in order to determine whether the associated topic string matches the wildcard topic string. In the example herein, the analyzer (215) determines that the topic string (e.g. "Sport") matches the wildcard topic string. Furthermore, in the example herein, the analyzer (215) analyzes a value associated with the WILDCARD attribute of the first topic node (305) in accordance with one or more rules below.

Preferably, when a subscriber makes a subscription to a wildcard topic string that is less specific than an associated topic string of a particular topic node (i.e. wherein a node associated with the wildcard topic string is above the particular topic node in the topic tree), if a value "PASSTHROUGH" is assigned to the particular topic node and if the topic string of the particular node matches the wildcard topic string, the subscriber will receive messages published to the associated topic string of the particular topic node. Furthermore, the subscriber will receive messages published to topic strings more specific (i.e. topic strings associated with topic nodes below the particular topic node in the topic tree) than the associated topic string of the particular topic node—if each of the values of the topic nodes below the particular topic node in the topic tree is also PASSTHROUGH and if each of the topic strings of the topic nodes below the particular topic node matches the wildcard topic string.

Preferably, if a value "BLOCK" is assigned to a particular topic node, a subscriber with a subscription made to a wildcard topic string less specific than the associated topic string of the particular topic node will not receive messages published to the associated topic string of the particular topic node or to topic strings more specific than the associated topic string of the particular topic node. However, preferably, if a value "BLOCK" is assigned to a particular topic node, a subscriber with a subscription made to a wildcard topic string which matches "directly" the associated topic string of the particular topic node will receive messages associated with the topic string of the particular topic node. The term "directly" herein means that a portion of the topic string preceding a wildcard character and a forward slash immediately preceding the wildcard character is the same as a topic string of the particular topic node. For example, a wildcard topic string "x/y/z/#" directly matches a topic string "x/y/z."

Furthermore, preferably, if a value "BLOCK" is assigned to a particular topic node and if the wildcard topic string matches a topic string that is more specific than the associated topic string of the particular topic node and if the topic node of the topic string that is more specific than the associated topic string of the particular topic node has a value of "PASSTHROUGH," the subscriber will receive messages associated with the topic string that is more specific than the associated topic string of the particular topic node. Furthermore, preferably, if a value "BLOCK" is assigned to a particular topic node and if a subscriber has a subscription made to a wildcard topic string which matches directly a topic string that is more specific than the associated topic string of the particular topic node and if the topic node of the topic string that is more specific than the associated topic string of the particular topic node has a value of "PASSTHROUGH," the subscriber will receive messages associated with the topic string that is more specific than the associated topic string of the particular topic node.

In the example herein, the analyzer (215) determines that the value associated with the WILDCARD attribute of the first topic node (305) is "PASSTHROUGH." In response, the analyzer (215) is operable to determine (step 425) whether it should continue its analysis. In accordance with one or more analysis rules, the analyzer (215) determines (step 425) that it should continue its analysis and adds (step 430) information associated with the subscriber S1 to a linked listed data structure associated with the first topic node (305). Preferably, information associated with the subscriber (e.g. S1) associated with the wildcard topic string subscription is linked to information associated with existing subscribers associated with the first topic node (305) (e.g. S2).

It should be understood that when a message is subsequently published to the topic string of the first topic node (305), a look-up of the linked listed data structure occurs in order to find the subscribers (e.g. S1 and S2) to which the message should be sent. Advantageously, pre-calculation of subscribers by creating a linked list, ensures that when a message is subsequently published, the message is delivered efficiently to subscribers.

Next, in the preferred embodiment, the analyzer (215) recursively analyzes the next topic node downwards from the first topic node (305). In the example herein, the analyzer (215) analyzes an associated topic string of the second topic node (310) in order to determine whether the associated topic string matches the wildcard topic string. In the example herein, the analyzer (215) determines that the topic string (e.g. "Sport/System_admin") matches the wildcard topic string. Further, the analyzer (215) analyses a value associated with the WILDCARD attribute of the second topic node (310). In the example herein, the analyzer (215) determines that the value associated with the WILDCARD attribute of the second topic node (310) is "BLOCK."

In response, the analyzer (215) is operable to determine (step 425) whether it should continue its analysis. In accordance with one or more analysis rules, the analyzer (215) determines (step 425) that it should not continue its analysis and in response, the analyzer (215) stops its analysis of the second topic node (310). This is because, in accordance with the one or more rules, a value "BLOCK" is assigned to the second topic node (310) and a subscriber (e.g. S1) makes a subscription to a wildcard topic string less specific than the associated topic string of the second topic node (310). Thus, the subscriber (e.g. S1) will not receive messages published to the associated topic string of the second topic node (310).

Thus, even though the topic string "Sport/System_admin" associated with the second topic node (310) matches the wildcard topic string of the subscription, the subscriber (e.g. S1) will not receive messages published to the associated topic string of the second topic node (310). Furthermore, the subscribers associated with the second topic node (310) are not linked to the subscriber (e.g. S1) associated with the wildcard topic string subscription stored in the linked list data structure. Note that in accordance with the one or more rules, the subscriber (e.g. S1) will also not receive messages published to topic strings more specific than the associated topic string of the second topic node (310) in accordance with the one or more rules.

In the example herein, there are two topic strings more specific than the associated topic string of the second topic node (310), namely, "Sport/System_admin/Status" and "Sport/System_admin/Alerts." The analyzer (215) does not analyze each of the topic nodes (315, 320) below the second topic node (310) and the subscribers associated with each of the topic nodes (315, 320) below the second topic node (310) are not linked to the subscriber (e.g. S1) associated with the wildcard topic string subscription stored in the linked list data structure, even though, the two topic strings match the wildcard topic string and even though each of the topic nodes (315, 320) below the second topic node (310) has an associated WILDCARD attribute with a value of "PASSTHROUGH."

Next, in the preferred embodiment, the analyzer (215) recursively analyzes the next topic node downwards from the first topic node (305), namely, the fifth topic node (325). In the example herein, the analyzer (215) determines that the topic string (e.g. "Sport/Football") matches the wildcard topic string. In the example herein, the analyzer (215) determines that the value associated with the WILDCARD attribute of the fifth topic node (325) is "PASSTHROUGH." In response, the analyzer (215) is operable to determine (step 425) whether it should continue its analysis.

In accordance with one or more analysis rules, the analyzer (215) determines (step 425) that it should continue its analysis and adds (step 430) information associated with the subscriber S1 to a linked listed data structure associated with the fifth topic node (325). Preferably, information associated with the subscriber (e.g. S1) associated with the wildcard topic string subscription is linked to information associated with existing subscribers associated with the fifth topic node (325) (e.g. S3). When a message is subsequently published to the topic string of the fifth topic node (325), a look-up of the linked listed data structure occurs in order to find the subscribers (e.g. S1 and S3) to which the message should be sent.

Next, in the preferred embodiment, the analyzer (215) recursively analyzes the next topic node downwards from the fifth topic node (325), namely, the sixth topic node (330). In the example herein, the analyzer (215) determines that the topic string (e.g. "Sport/Football/Team_A") matches the wildcard topic string. In the example herein, the analyzer (215) determines that the value associated with the WILDCARD attribute of the sixth topic node (330) is "PASSTHROUGH." In response, the analyzer (215) is operable to determine (step 425) whether it should continue its analysis.

In accordance with one or more analysis rules, the analyzer (215) determines (step 425) that it should continue its analysis and adds (step 430) information associated with the subscriber S1 to a linked listed data structure associated with the sixth topic node (330). Preferably, information associated with the subscriber (e.g. S1) associated with the wildcard topic string subscription is linked to information associated with existing subscribers associated with the sixth topic node (330) (e.g. S4). When a message is subsequently published to the topic string of the sixth topic node (330), a look-up of the linked listed data structure occurs in order to find the subscribers (e.g. S1 and S4) to which the message should be sent.

In another example, a subscriber (e.g. S1) makes a subscription directly to a wildcard topic string (e.g. "Sport/System_admin/#") associated with the second topic node (310). The analyzer (215) determines that a highest level topic node in the topic tree which may match is the second topic node (310). The analyzer (215) determines that the topic string (e.g. "Sport/System_admin") matches the wildcard topic string. Further, the analyzer (215) determines that the value associated with the WILDCARD attribute of the second topic node (310) is "BLOCK."

In response, the analyzer (215) is operable to determine (step 425) whether it should continue its analysis. In accordance with one or more analysis rules, the analyzer (215) determines (step 425) that it should continue its analysis. In this example, rather than the analyzer (215) stopping its analysis of the second topic node (310), the analyzer (215) adds (step 430) information associated with the subscriber S1 to a linked listed data structure associated with the second topic node (310). Thus, in accordance with the one or more rules described above, because a wildcard topic string of subscription directly matches the associated topic string of the second topic node (310), the subscriber is operable to receive messages associated with the second topic node (310). Furthermore, on downward recursion from the second topic node (310), the analyzer (215) determines that each of the topic nodes (315, 320) below the second topic node (310) has a WILDCARD attribute value of PASSTHROUGH.

In response, the analyzer (215) is operable to determine (step 425) whether it should continue its analysis. In accordance with one or more analysis rules, the analyzer (215) determines (step 425) that it should continue its analysis and the analyzer (215) adds (step 430) information associated with the subscriber S1 to a linked listed data structure associated with each of the topic nodes (315, 320) below the second topic node (310).

Thus, in accordance with the one or more rules above and because each of the topic strings associated with each of the topic nodes (315, 320) below the second topic node (310) matches the wildcard topic string of the subscription, the subscriber also receives messages associated with the more specific topic strings (namely, "Sport/System_admin/Status" and "Sport/System_admin/Alerts") of each of these topic nodes (315, 320).

Advantageously, the preferred embodiment provides a more flexible mechanism for using wildcard topic strings. The preferred embodiment allows for a subscriber to easily subscribe to each topic string in the topic tree with the exception of those below and including a topic string of a topic node having a "BLOCK" value of the WILDCARD attribute when the subscriber makes a subscription to a wildcard topic string which is less specific than the topic string of the topic node having a "BLOCK" value of the WILDCARD attribute. This allows such a topic node to be, for example, used for system messages only. For example, an administrator may wish to partition the topic tree such that a portion of the topic tree can be reserved for messages which would be superfluous if received by general subscribers. Thus, only subscribers (e.g. technical support employees) who show an interest in the portion by specifically subscribing to the portion, will receive associated messages.

Figure 3C:
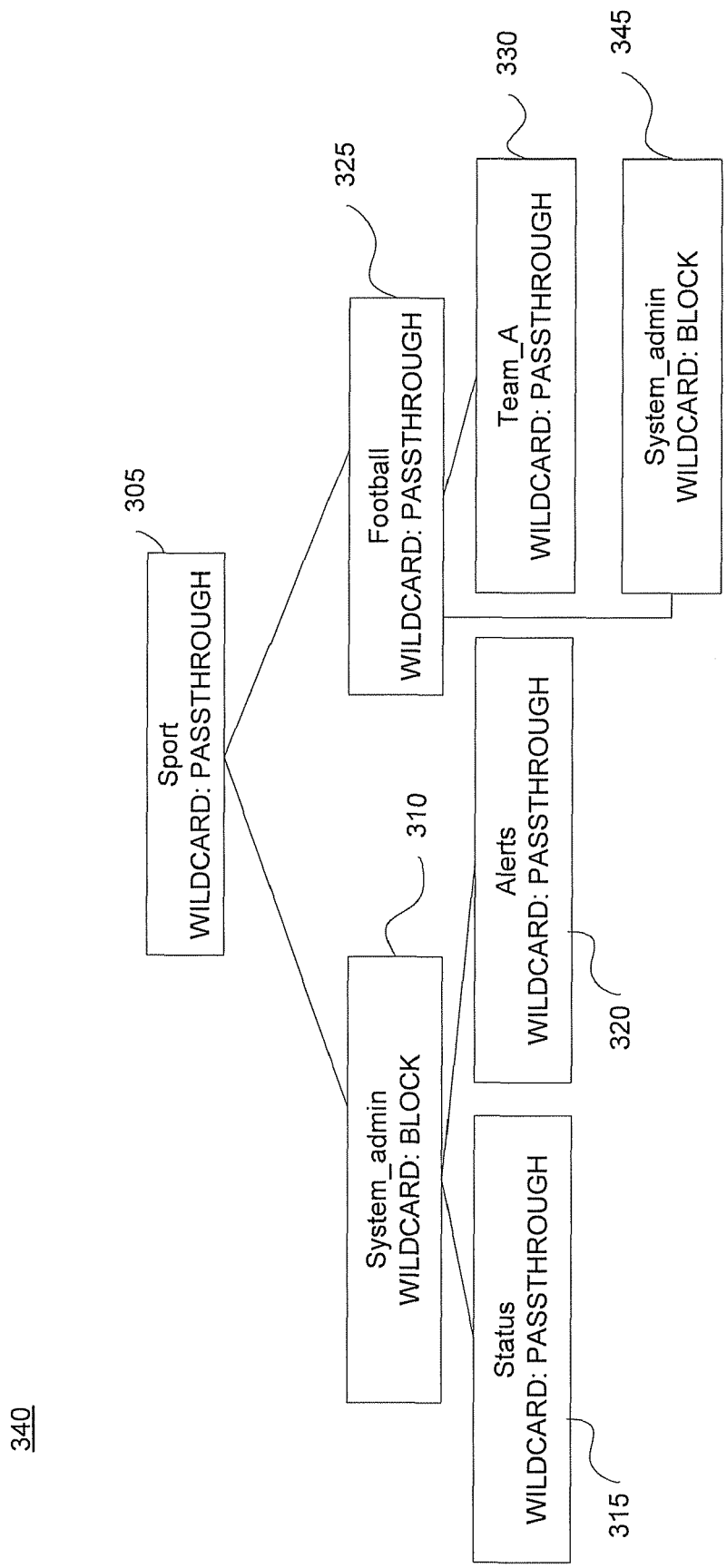
FIG. 3C is another representation of a topic tree according to the preferred embodiment.

In another example, a topic node can be used for a particular language. In yet another example, a topic node can be used for a particular security authorization level. Having a WILDCARD attribute assigned to each topic node is a particularly flexible solution as it allows the topic tree to be partitioned in different ways. For example, with reference to the topic tree (340) shown in FIG. 3C, a seventh topic node (345) is added, having an associated topic string, namely, "Sport/Football/System_admin". The seventh topic node (345) has an associated value of the WILDCARD attribute of "BLOCK." Thus, the topic string associated with the seventh topic node (345) can be used, for example, for messages pertaining to the status of messages associated with the "Sport/Football" topic string. Thus, for example, a subscriber with a subscription to the wildcard topic string "#" will not receive messages associated with "Sport/Football/System_admin."

In an alternative implementation, a subset of topic nodes in the topic tree can be assigned a WILDCARD attribute.

Advantageously, the preferred embodiment provides an apparatus, method and computer program for allowing a subscription to only apply to a certain portion of the topic tree, even though the wildcard topic string associated with the subscription may match topic strings associated with topic nodes in other parts of the topic tree.

Figure 3D:
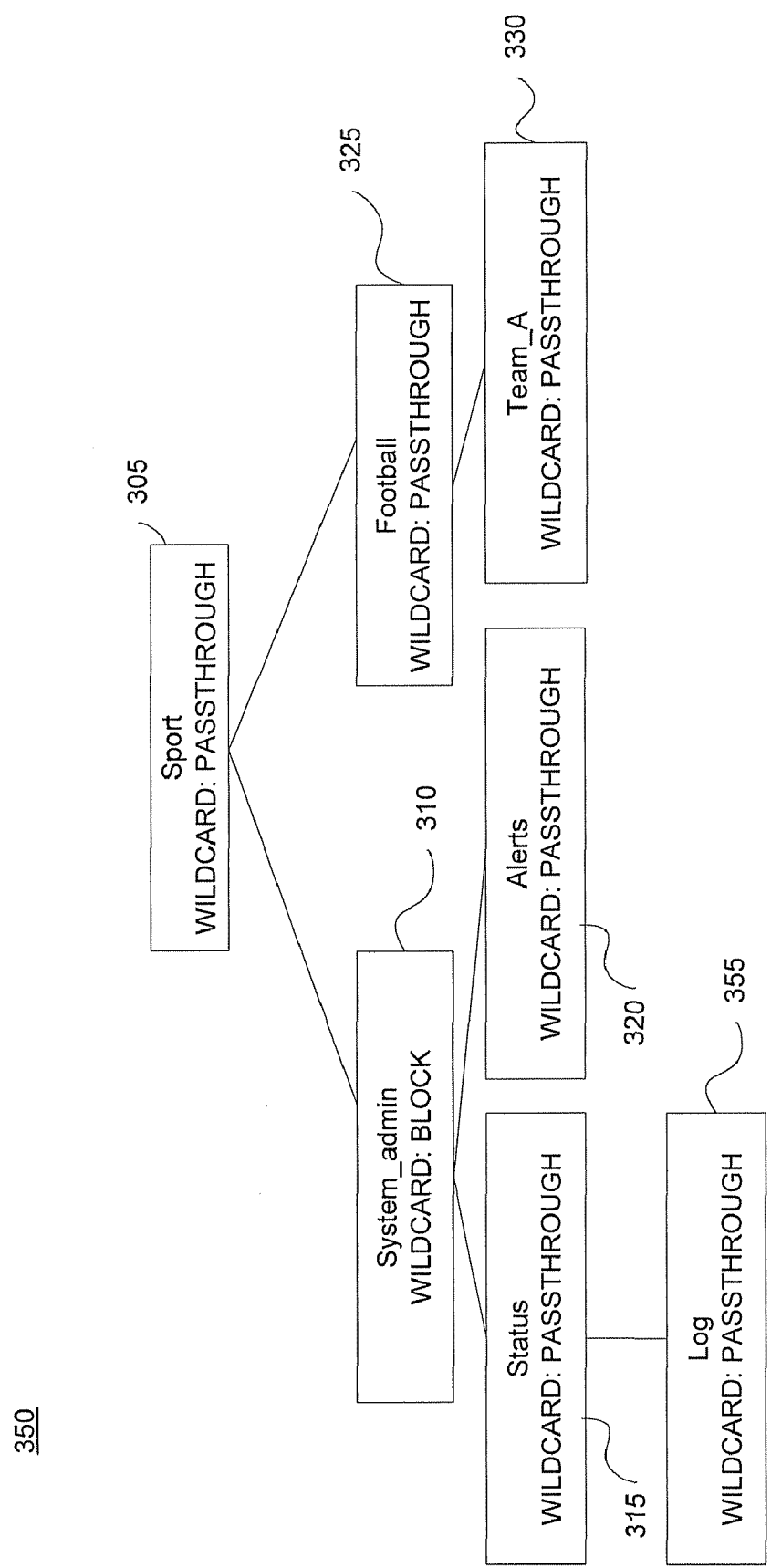
FIG. 3D is yet another representation of a topic tree according to the preferred embodiment.
Figure 4:
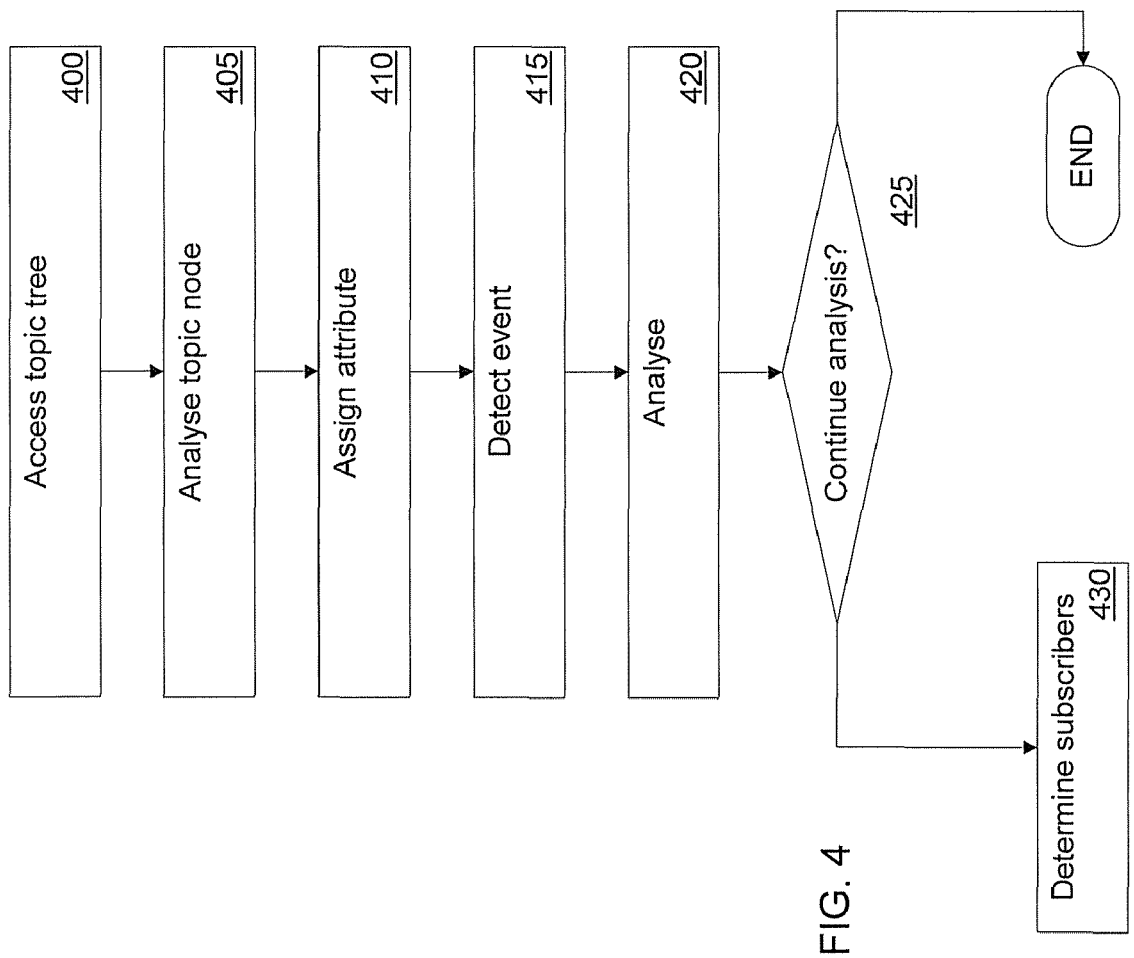
FIG. 4 is a flow chart showing the operational steps involved in a process according to the preferred embodiment.

Another example associated with detection of a second event will now be described. With reference to step 415, in response to detecting the second event, wherein the second event is associated with a new topic node being generated (e.g. by listening to the topic tree representation), the detector (210) invokes the analyzer (215). In the example herein, with reference to the topic tree (350) shown in FIG. 3D, an eighth topic node (355) is added, having an associated topic string, namely, "Sport/System_admin/Status/Log." The eighth topic node (355) has an associated value of the WILDCARD attribute of "PASSTHROUGH."

In the preferred embodiment, in response to a new topic node being generated and in response to being invoked by the detector (210), the analyzer (215) executes an analysis process (step 420). In the example herein, the analyzer (215) analyzes a parent node (315) of the new topic node (355). In the example herein, the analyzer (215) analyzes a value associated with the WILDCARD attribute of the third topic node (315) and determines that the value is "PASSTHROUGH."

In response, the analyzer (215) is operable to determine (step 425) whether it should continue its analysis. In accordance with one or more analysis rules, the analyzer (215) determines (step 425) that it should continue its analysis. In response, the analyzer (215) determines whether there is a subscription having a wildcard topic string associated with the third topic node (315). In this example herein, the analyzer (215) determines that the third topic node (315) has an associated subscription having a wildcard topic string (namely, "Sport/System_admin/Status/#") made by a subscriber (e.g. "S5"). In response, the analyzer (215) determines whether the topic string of the new topic node (355) matches the wildcard topic string of the subscription. In the example herein, the analyzer (215) determines that the topic string of the new topic node (355) ("Sport/System_admin/Status/Log") matches the wildcard topic string of the subscription ("Sport/System_admin/Status/#").

In response, the analyzer (215) adds (step 430) information associated with the subscriber S5 to a linked listed data structure associated with the new topic node (355). Preferably, information associated with the subscriber (e.g. S5) associated with the wildcard topic string subscription is linked to information associated with existing subscribers associated with the new topic node (355) (e.g. in this example, the new topic node (355) does not yet comprise any existing subscribers). When a message is subsequently published to the topic string of the new topic node (355), a look-up of the linked listed data structure occurs in order to find the subscribers (e.g. S5) to which the message should be sent.

Next, in the preferred embodiment, the analyzer (215) recursively analyzes the next parent node upwards from the third topic node (315), namely, the second topic node (310). In the example herein, the analyzer (215) analyzes a value associated with the WILDCARD attribute of the second topic node (310) and determines that the value is "BLOCK." In response, the analyzer (215) is operable to determine (step 425) whether it should continue its analysis. In accordance with one or more analysis rules, the analyzer (215) determines (step 425) that it should continue its analysis. Thus, in this example, rather than the analyzer (215) stopping its analysis of the second topic node (310), the analyzer (215) continues its analysis, in order to determine whether the second topic node (310) has a subscription having a wildcard topic string which directly matches the topic string of the second topic node (310).

In this example herein, the analyzer (215) determines that the second topic node (310) has an associated subscription having a wildcard topic string (namely, "Sport/System_admin/#") made by a subscriber (e.g. "S6"). That is, the wildcard topic string directly matches the topic string of the second topic node (310). In response, the analyzer (215) determines whether the topic string of the new topic node (355) matches the wildcard topic string of the subscription. In the example herein, the analyzer (215) determines that the topic string of the new topic node (355) ("Sport/System_admin/Status/Log") matches the wildcard topic string of the subscription ("Sport/System_admin/#").

In response, the analyzer (215) adds (step 430) information associated with the subscriber S6 to a linked listed data structure associated with the new topic node (355). Preferably, information associated with the subscriber (e.g. S6) associated with the wildcard topic string subscription is linked to information associated with existing subscribers associated with the new topic node (355) (e.g. S5). When a message is subsequently published to the topic string of the new topic node (355), a look-up of the linked listed data structure occurs in order to find the subscribers (e.g. S5 and S6) to which the message should be sent.

In response, the analyzer (215) is operable to determine (step 425) whether it should continue its analysis. In accordance with one or more analysis rules, the analyzer (215) determines (step 425) that it should not continue its analysis. In response to determining that the value "BLOCK" is assigned to the second topic node (310), the analyzer (215) stops its recursive analysis of parent nodes. Therefore, in the example herein, the analyzer (215) does not subsequently analyze the first topic node (305). The topic string of the new topic node (355) is not considered for matching to any wildcard topic strings associated with any wildcard subscriptions associated with the first topic node (305). Thus, a subscriber with a subscription made to a wildcard topic string less specific (e.g. "Sport/#") than the associated topic string of the second topic node (310) (e.g. "Sport/System_admin") will not receive messages published to the associated topic string of the second topic node (310) or to topic strings (e.g. a topic string "Sport/System_admin/Status/Log" of the new topic node (355)) that are more specific than the associated topic string of the second topic node (310).

It will be clear to one of ordinary skill in the art that all or part of the method of the preferred embodiments of the present invention may suitably and usefully be embodied in a logic apparatus, or a plurality of logic apparatuses, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analog communications lines, or intangibly using wireless techniques, including but not limited to microwave, infrared or other transmission techniques. The series of computer readable instructions embodies all or part of the functionality previously described herein.

Those skilled in the art will appreciate that such computer-readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, the preferred embodiment of the present invention may be realized in the form of computer implemented method of deploying a service comprising steps of deploying computer program code operable to, when deployed into a computer infrastructure and executed thereon, cause said computer system to perform all the steps of the described method.

It will be clear to one skilled in the art that many improvements and modifications can be made to the foregoing exemplary embodiment without departing from the scope of the present invention. The preceding description of preferred embodiments of the invention have been presented for the purposes of illustration. The description provided is not intended to limit the invention to the particular forms disclosed or described. Modifications and variations will be readily apparent from the preceding description. As a result, it is intended that the scope of the invention not be limited by the detailed description provided herein.

We claim:

1. An apparatus for controlling subscriptions, the apparatus comprising:
a processor;
a non-transitory computer-readable storage having stored thereon a computer program configured for controlling the processor to perform the steps of:
assigning one of a PASSTHROUGH value and a BLOCK value to a first attribute of each topic node of a topic tree based on at least one assignment rule;
responsive to a wildcard topic string, determining a highest level topic node of the topic tree matching the wildcard topic string to define a root node;
traversing each topic node of the topic tree starting the root node, the traversing comprising:
analyzing the first attribute of the topic node to determine whether the first attribute specifies the PASSTHROUGH value or the BLOCK value,
if the first attribute specifies the PASSTHROUGH value, determining a subscriber associated with the subscription should receive a message associated with the topic string of the topic node, and
if the first attribute specifies the BLOCK value, determining that the subscriber should not receive a message associated with the topic string of the topic node or a message associated with other topic strings more specific than the topic string of the topic node when the wildcard topic string is less specific than the topic string of the topic node;

detecting a generation of a new topic node; and performing the traversing for the new topic node.

2. The apparatus of claim 1, the traversing further comprising that when the first attribute specifies the BLOCK value and the wildcard topic string directly matches the topic string of the topic node, determining that the subscriber should receive a message associated with the topic string.

3. The apparatus of claim 1, wherein the computer program further configured for controlling the processor to perform the step of adding data associated with the subscriber to a linked list data structure associated with the topic node.

4. A method for controlling subscriptions, the method comprising:

assigning one of a PASSTHROUGH value and a BLOCK value to a first attribute of each topic node of a topic tree based on at least one assignment rule;

responsive to a wildcard topic string, determining a highest level topic node of the topic tree matching the wildcard topic string to define a root node;

traversing, via a processor, each topic node of the topic tree starting the root node, the traversing comprising:

analyzing the first attribute of the topic node to determine whether the first attribute specifies the PASSTHROUGH value or the BLOCK value, if the first attribute specifies the PASSTHROUGH value, determining a subscriber associated with the subscription should receive a message associated with the topic string of the topic node, and if the first attribute specifies the BLOCK value, determining that the subscriber should not receive a message associated with the topic string of the topic node and topic strings more specific than the topic string of the topic node when the wildcard topic string is less specific than the topic string of the topic node;

detecting a generation of a new topic node; and performing the traversing for the new topic node.

5. The method of claim 4, the traversing further comprising that when the first attribute specifies the BLOCK value and the wildcard topic string directly matches the topic string of the topic node, determining that the subscriber should receive a message associated with the topic string.

6. The method of claim 4, further comprising adding data associated with the subscriber to a linked list data structure associated with the topic node.

7. A non-transitory computer-readable storage-medium containing a computer program comprising program code, which, when loaded in and executed by a computer causes the computer to perform the steps of:

assigning one of a PASSTHROUGH value and a BLOCK value to a first attribute of each topic node of a topic tree based on at least one assignment rule;

responsive to a wildcard topic string, determining a highest level topic node of the topic tree matching the wildcard topic string to define a root node; and traversing, via a processor, each topic node of the topic tree starting the root node, the traversing comprising:

analyzing the first attribute of the topic node to determine whether the first attribute specifies the PASSTHROUGH value or the BLOCK value, if the first attribute specifies the PASSTHROUGH value, determining a subscriber associated with the subscription should receive a message associated with the topic string of the topic node, and if the first attribute specifies the BLOCK value, determining that the subscriber should not receive a message associated with the topic string of the topic node and topic strings more specific than the topic string of the topic node when the wildcard topic string is less specific than the topic string of the topic node;

detecting a generation of a new topic node; and performing the traversing for the new topic node.

* * * * *